(12) United States Patent
Jeon et al.

(10) Patent No.: US 12,731,849 B2
(45) Date of Patent: Sep. 8, 2026

(54) TRAY FOR SECONDARY BATTERY AND TRAY ASSEMBLY COMPRISING THE SAME

(71) Applicant: LG Energy Solution, Ltd., Seoul (KR)

(72) Inventors: Joong Hyuk Jeon, Daejeon (KR); Ki Woong Kim, Daejeon (KR); In Gu An, Daejeon (KR); Hyoung Sik Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 812 days.

(21) Appl. No.: 18/012,005

(22) PCT Filed: Jul. 20, 2021

(86) PCT No.: PCT/KR2021/009358
§ 371 (c)(1),
(2) Date: Dec. 21, 2022

(87) PCT Pub. No.: WO2022/019623
PCT Pub. Date: Jan. 27, 2022

(65) Prior Publication Data

US 2023/0268598 A1 Aug. 24, 2023

(30) Foreign Application Priority Data

Jul. 20, 2020 (KR) ........................ 10-2020-0089910

(51) Int. Cl.
*H01M 50/262* (2021.01)

(52) U.S. Cl.
CPC ................................ *H01M 50/262* (2021.01)

(58) Field of Classification Search
CPC .............. H01M 50/262; H01M 50/202; B65D 21/0209
See application file for complete search history.

(56) References Cited

U.S. PATENT DOCUMENTS 9,972,811 B2 5/2018 Ogawa et al.
2009/0239137 A1* 9/2009 Kakuchi ............ H01M 50/271 429/151

(Continued)

FOREIGN PATENT DOCUMENTS

CN 201616460 U 10/2010
CN 203071146 U 7/2013

(Continued)

OTHER PUBLICATIONS

Extended European Search Report including Written Opinion for Application No. 21847094.6 dated Jul. 9, 2024. 9 pgs.

(Continued)

*Primary Examiner* — Maria Laios
(74) *Attorney, Agent, or Firm* — Lerner David LLP

(57) ABSTRACT

The present invention relates to a tray for a secondary battery, which comprises: an accommodation part having a bottom surface, on which the secondary battery is disposed, and a side surface provided along an edge of the bottom surface to accommodate the secondary battery; and a pressing part configured to press a side portion of the secondary battery while descending to the bottom surface and moving to the secondary battery due to a load of the tray loaded on an upper end to fix the secondary battery.

8 Claims, 13 Drawing Sheets

(56) References Cited

U.S. PATENT DOCUMENTS

2014/0030570 A1* 1/2014 Imanishi ............ H01M 50/109 429/100
2015/0214570 A1* 7/2015 Deponte ............ H01M 50/242 29/623.5
2016/0276636 A1 9/2016 Kim et al.
2016/0336555 A1 11/2016 Guen et al.
2017/0047562 A1 2/2017 Ogawa et al.
2018/0034121 A1 2/2018 Kwon et al.
2019/0168699 A1* 6/2019 Oyama .................. B60L 50/64

FOREIGN PATENT DOCUMENTS

CN 106450072 A 2/2017
DE 10-2016-212783 A1 1/2018
JP H0743945 Y2 10/1995
JP 2001283799 A 10/2001
JP 2002042760 A 2/2002
JP 2003-142057 A 5/2003
JP 2004-193023 A 7/2004
JP 2005150021 A 6/2005
JP 2005150055 A 6/2005
JP 2007-153374 A 6/2007
JP 2010-205442 A 9/2010
JP 2012046240 A * 3/2012
JP 2012069455 A 4/2012
JP 2012-101663 A 5/2012
JP 2015091714 A 5/2015
JP 2017-204486 A 11/2017
JP 2018108789 A 7/2018
JP 2019-036422 A 3/2019
KR 101011258 B1 1/2011
KR 20140099705 A 8/2014
KR 20150037380 A 4/2015
KR 20160034006 A 3/2016
KR 20160113079 A 9/2016
KR 20160114367 A 10/2016
KR 20160134124 A 11/2016
KR 20170092800 A 8/2017
KR 20180068379 A 6/2018
KR 20180069254 A 6/2018
KR 20180081357 A 7/2018
KR 20190050056 A 5/2019
KR 20200076436 A 6/2020

OTHER PUBLICATIONS

International Search Report for PCT/KR2021/009358 mailed Oct. 28, 2021. 3 pgs.

Search Report dated Aug. 25, 2025 from the Office Action for Chinese Application No. 202180044840.6 issued Aug. 29, 2025, pp. 1-3.

Extended European Search Report including Written Opinion for Application No. 25190043.7 dated Aug. 19, 2025, pp. 1-9.

* cited by examiner

TRAY FOR SECONDARY BATTERY AND TRAY ASSEMBLY COMPRISING THE SAME

CROSS-REFERENCE TO RELATED APPLICATION

The present application is a national phase entry under 35 U.S.C. § 371 of International Application No. PCT/KR2021/009358, filed Jul. 20, 2021, which claims the benefit of the priority of Korean Patent Application No. 10-2020-0089910, filed on Jul. 20, 2020, each of which is hereby incorporated by reference in its entirety.

TECHNICAL FIELD

Technical Field

The present invention relates to a tray for a secondary battery having an improved fixing force of the secondary battery, and a tray assembly comprising the same.

Background Art

In general, secondary batteries refer to chargeable and dischargeable, unlike primary batteries that are not chargeable. The secondary batteries are being widely used for mobile phones, notebook computers, and camcorders, electric vehicles, and the like.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

The secondary battery uses a tray for storage and packaging, and the tray has an accommodation groove for accommodating one or more secondary batteries. The accommodation groove comprises a bottom surface on which the secondary battery is disposed, and a sidewall surface supporting a side portion of the secondary battery.

However, the tray has a problem in that the secondary battery moves due to movement thereof or an external impact, and thus, a sealing part of the secondary battery collides with the sidewall surface of the tray, thereby causing damage of the secondary battery.

DISCLOSURE OF THE INVENTION

Technical Problem

The present invention is invented to solve the above problem, and an object of the present invention is to provide a tray for a secondary battery, in which the tray is improved to more firmly fix the secondary battery accommodated in the tray to prevent a sealing part of the secondary battery from colliding with a side surface of the tray, thereby preventing the secondary battery from being damaged, and a tray assembly comprising the same.

Technical Solution

A tray for a secondary battery, which is loaded in multiple stages, according to the present invention for achieving the above object comprises: an accommodation part having a bottom surface, on which the secondary battery is disposed, and a side surface provided along an edge of the bottom surface to accommodate the secondary battery; and a pressing part configured to press a side portion of the secondary battery while descending to the bottom surface and moving to the secondary battery due to a load of the tray loaded on an upper end to fix the secondary battery.

The accommodation part may be provided with an opening groove in the side surface, and the opening groove is formed to be opened from a boundary line between the bottom surface and the side surface to an upper end of the side surface, and the pressing part may be provided in the opening groove and have a lower end connected to the boundary line between the bottom surface and the side surface and an upper end protruding above an upper end of the side surface.

The pressing part may comprise: a foldable surface connected to be foldable in a direction of the secondary battery at the boundary line between the bottom surface and the side surface; and a pressing surface having a lower end connected to an upper end of the foldable surface and an upper end protruding above the upper end of the side surface to descend to the bottom surface by pressing of the tray loaded on the upper end and move to the secondary battery by folding of the foldable surface.

The pressing part may further comprise a pushing surface provided on the upper end of the pressing surface and having an area greater than that of the pressing surface 122 to support the tray loaded on the upper end.

The foldable surface, the pressing surface, and the pushing surface may be integrally formed.

The accommodation part and the pressing part may be integrally formed.

A folding groove for inducing the folding may be formed in a connection portion between the bottom surface and the foldable surface or a connection portion between the foldable surface and the pressing surface.

An elastic part having elastic restoring force is further provided at a connection portion between the bottom surface and the foldable surface or a connection portion between the foldable surface and the pressing surface, and the elastic part may allow each of the foldable surface and the pressing surface to return to its original position when the tray loaded on the upper end is removed.

A tray for a secondary battery, which is loaded in multiple stages, comprises: an accommodation part having a bottom surface, on which the secondary battery is disposed, and a side surface provided along an edge of the bottom surface to accommodate the secondary battery; and a pressing part provided on the side surface and having a structure that protrudes to the secondary battery to press a side portion of the secondary battery accommodated in the accommodation part, thereby fixing the secondary battery.

The pressing part may have an inverted triangular cross-sectional shape in which a thickness of the pressing part gradually increases in a direction of the secondary battery from a lower end to an upper end of the side surface connected to the bottom surface.

A tray assembly for a secondary battery according to the present invention comprises: a tray for a secondary battery; and an accommodation box configured to accommodate the tray for the secondary battery.

Advantageous Effects

The tray for the secondary battery according to the present invention may comprise the accommodation part accommodating the secondary battery and the pressing part pressing the side portion of the secondary battery while descending by the pressing of the tray or the cover plate, which is loaded on the upper end, and simultaneously, moving to the direction of the secondary battery to more firmly fix the secondary battery accommodated in the tray, and thus prevent the secondary battery and the tray from colliding with each other by the movement or the external impact, thereby preventing the secondary battery from being damaged.

That is, the tray for the secondary battery according to the present invention may easily accommodate the secondary battery in the tray when there is no tray disposed on the upper end, and may firmly fix the secondary battery accommodated in the tray when the tray is disposed on the upper end. As a result, the convenience and efficiency of use may be significantly improved. Particularly, the sealing part provided on the side surface of the secondary battery may be pressed to prevent the corresponding portion from being spread, and the full-width standard of the product (e.g., the secondary battery) may be uniformly maintained. Therefore, the defects may be prevented from occurring in the subsequent process (e.g., the assembly process). In addition, since the trays are stacked together, the trays may be stored in the same method as the existing method.

In addition, in the tray for the secondary battery according to the present invention, the pressing part may comprise the foldable surface and the pressing surface. Thus, when the tray is loaded on the upper end, the foldable surface of the pressing part may be folded to allow the pressing surface to ascend or move in the lateral direction of the secondary battery, thereby more firmly fixing the secondary battery accommodated in the tray.

In addition, in the tray for the secondary battery according to the present invention, the pressing part may be provided in the opening groove formed in the accommodation part to prevent the sidewall of the tray from increasing in thickness. Particularly, the pressing part may vertically move along the opening groove to improve the operability of the pressing part.

In addition, in the tray for the secondary battery according to the present invention, the pressing part may further comprise the pushing surface to improve the strength of the pressing part, thereby preventing the pressing part from being folded or buckled by the tray loaded on the upper end.

In addition, in the tray for the secondary battery according to the present invention, the accommodation part the pressing part may be integrally formed to significantly improve the efficiency and reduce the manufacturing cost.

In addition, in the tray for the secondary battery according to the present invention, the pressing part may have the folding groove for inducing the folding at the connection portion between the bottom surface and the foldable surface or the connection portion between the foldable surface and the pressing surface to induce the stable folding of the foldable surface when the tray is loaded on the upper end. That is, even if the pressing of the tray loaded on the upper end is low, the foldable surface may be stably folded, and thus, the side portion of the secondary battery may be stably pressed through the pressing surface.

MODE FOR CARRYING OUT THE INVENTION

Figure 1:
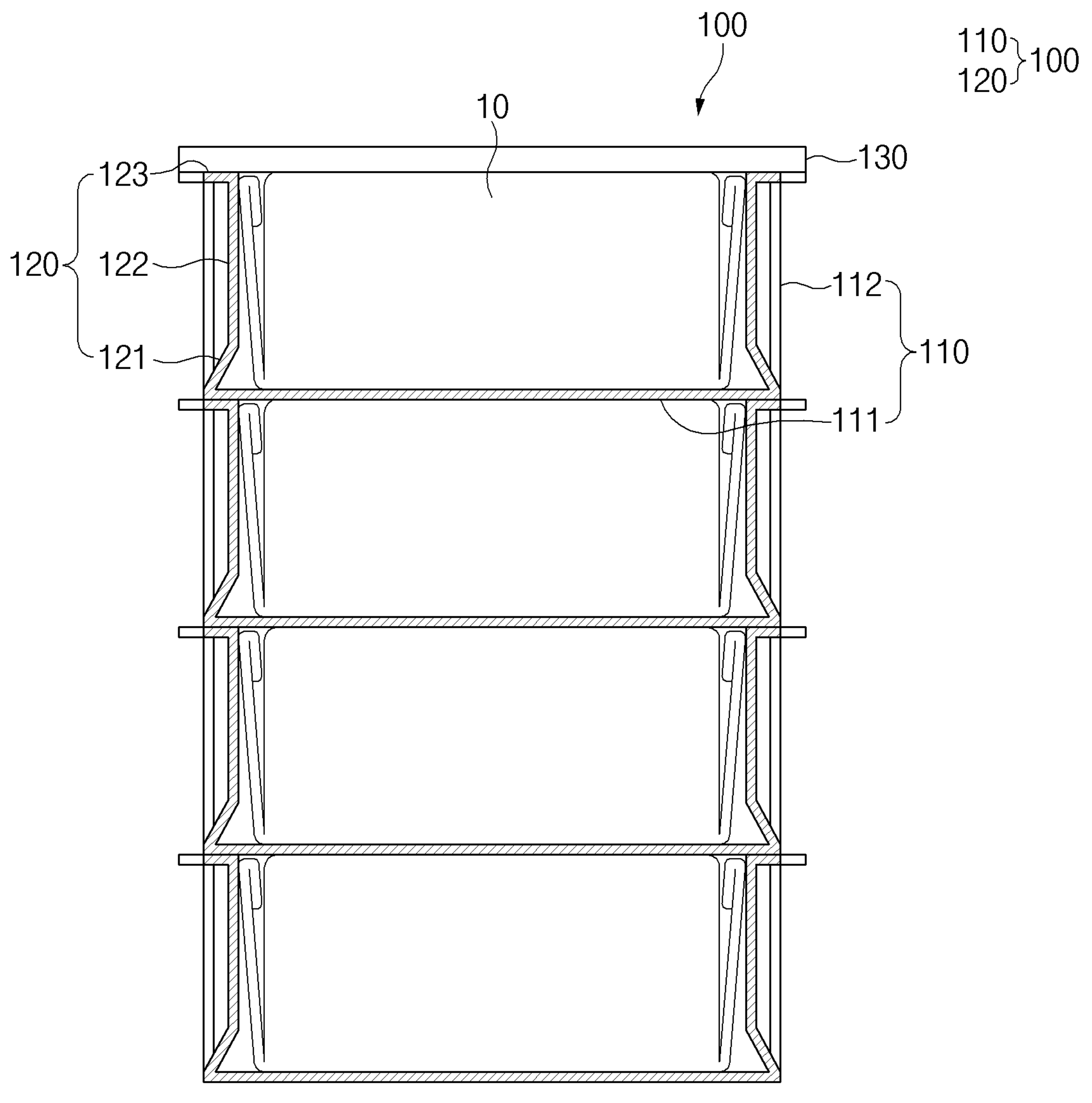
FIG. 1 is a side view of trays loaded in multiple stages according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Tray for Secondary Battery According to First Embodiment of the Present Invention A tray 100 for a secondary battery according to a first embodiment of the present invention accommodates secondary batteries and is disposed in multiple stages, and in particular, has a structure that is capable of improving fixing force of the secondary battery due to pressing of a pressing object, which is disposed on an upper end.

Here, the pressing object may be another tray or cover plate disposed on the upper end of the tray.

The present invention will be described as one embodiment that the tray is disposed on the upper end.

That is, as illustrated in FIGS. 1 to 7, the tray 100 for the secondary battery according to the first embodiment of the present invention comprises an accommodation part 110 accommodating a secondary battery 10 and a pressing part 120 pressing the secondary battery 10 accommodated in the accommodation part 110.

Accommodation Part

The accommodation part 110 has a box shape with an opened upper portion and comprises a bottom surface 111, on which the secondary battery 10 is disposed, and a side surface 112 provided along an edge of the bottom surface 111 to accommodate the secondary battery 10.

The accommodation part 110 has an opening groove 113 formed in the side surface 112, and the opening groove 113 is formed to be opened from a boundary line between the bottom surface 111 and the side surface 112 to an upper end of the side surface 112.

Pressing Part

The pressing part 120 is provided in the opening groove 113. Here, the pressing part 120 has a lower end connected to the boundary line between the bottom surface 111 and the side surface 112 and an upper end formed to protrude above the upper end of the side surface 112. Thus, an increase in thickness of the tray 100 may be minimized.

Particularly, the pressing part 120 may press a side portion of the secondary battery 10 while descending to the bottom surface 110 and moving to the secondary battery 10 accommodated in the accommodation part 110 due to pressing of the tray 100 loaded on the upper end. Thus, the pressing part 120 may fix the secondary battery without movement of the secondary battery 10.

That is, the pressing part 120 comprises a foldable surface 121 and a pressing surface 122.

The foldable surface 121 is connected to the boundary line between the bottom surface 111 and the side surface 112 and is provided to be foldable in a lateral direction of the secondary battery 10 accommodated in the accommodation part 110.

The pressing surface 122 has a lower end connected to an upper end of the foldable surface 121 and an upper end protrudes above the upper end of the side surface 112. Thus, the pressing surface 122 descends to the bottom surface 111 by the pressing of the tray 100 loaded on the upper end and simultaneously moves to the secondary battery 10 by folding of the foldable surface 121.

When the trays 100 for the secondary battery, in which the secondary batteries 10 are accommodated, respectively, are loaded in multiple stages, the pressing surface of the pressing part 120 having the above-described structure descends to the bottom surface 111 of the accommodation part 110 while the pressing surface of the tray 100 for the secondary battery, which is loaded on the lower end, is pressed by the tray 100 for the secondary battery, which is loaded on the upper end. Here, the foldable surface 121 is folded to the secondary battery 10 by the pressing surface 122, and as a result, the pressing surface 122 descends and simultaneously moves to the secondary battery 10. Thus, the pressing surface 122 may press the side portion of the secondary battery 10 accommodated in the accommodation part 110 and may fix the secondary battery 10.

When the tray 100 for the secondary battery, which is loaded on the upper end, is removed, the foldable surface 121 of the tray 100 loaded on the lower end may return to its original position, and the pressing surface 122 may return to its original position by the foldable surface 121. Thus, the fixing force for the secondary battery 10 accommodated in the accommodation part 110 may be released.

The pressing part 120 further comprises a pushing surface 123 provided on an upper end of the pressing surface 122 and having an area greater than that of the pressing surface 122 when viewed from a top surface of the tray to support the tray 100 loaded on the upper end. That is, the pushing surface 123 may improve strength of the pressing part 120 to prevent the pressing surface 122 from being folded or buckled, thereby stably supporting the tray.

Figure 2:
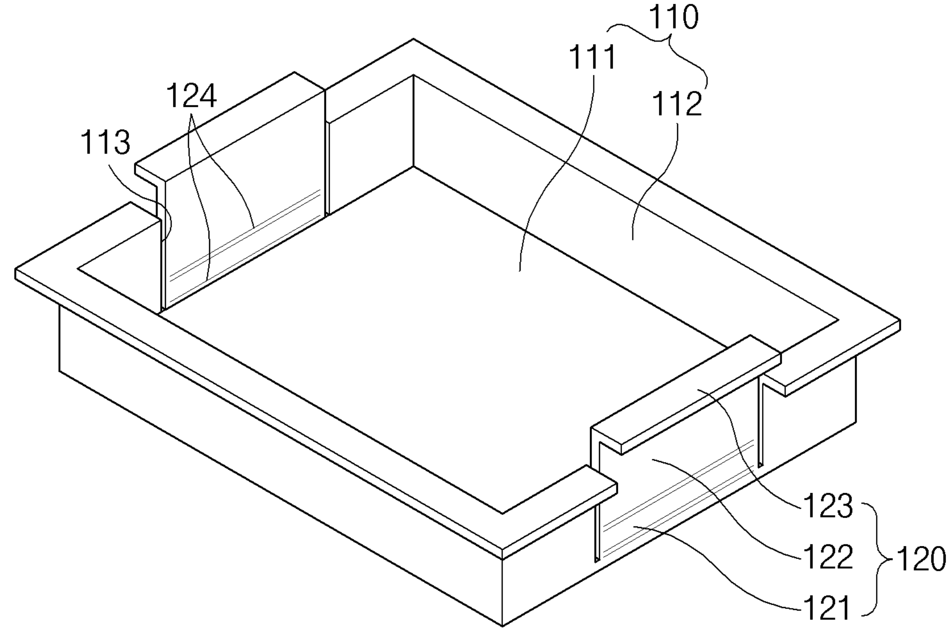
FIG. 2 is a perspective view of a tray for a secondary battery according to the first embodiment of the present invention.
Figure 3:
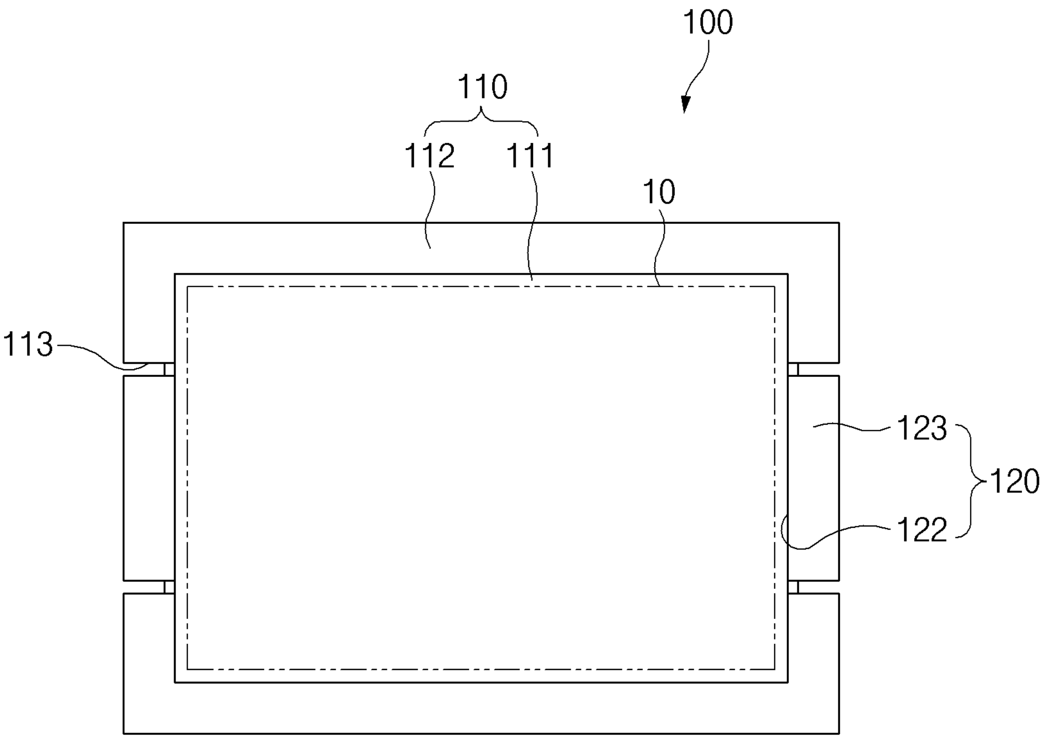
FIG. 3 is a plan view of FIG. 2.
Figure 4:
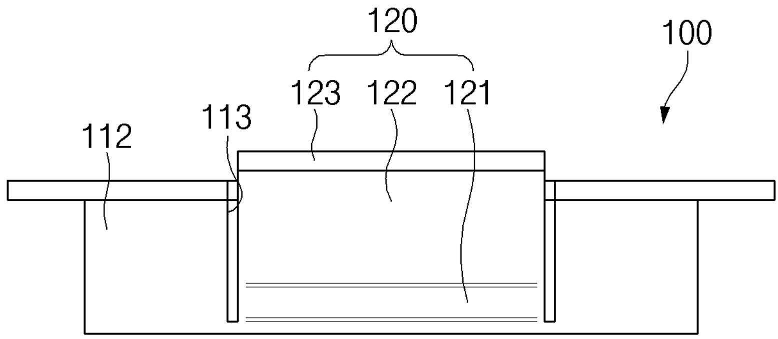
FIG. 4 is a side view of FIG. 2.
Figure 5:
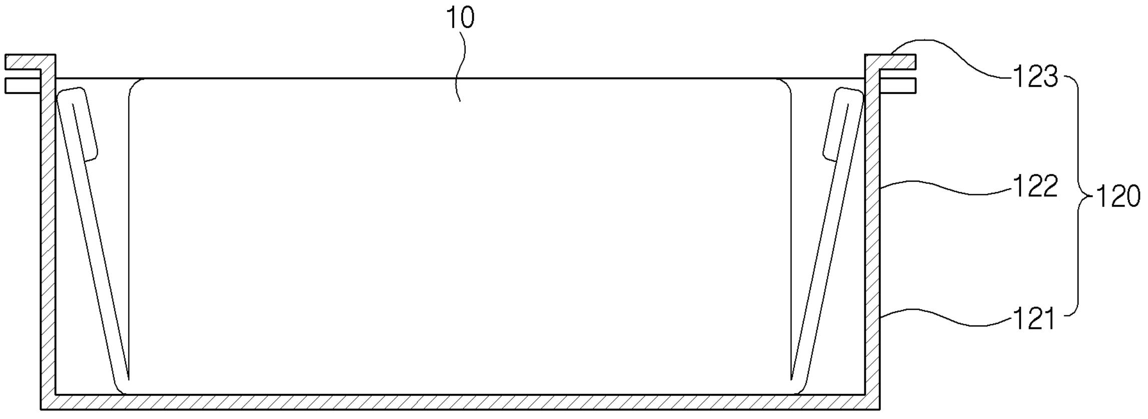
FIG. 5 is a cross-sectional view of FIG. 2.
Figure 6:
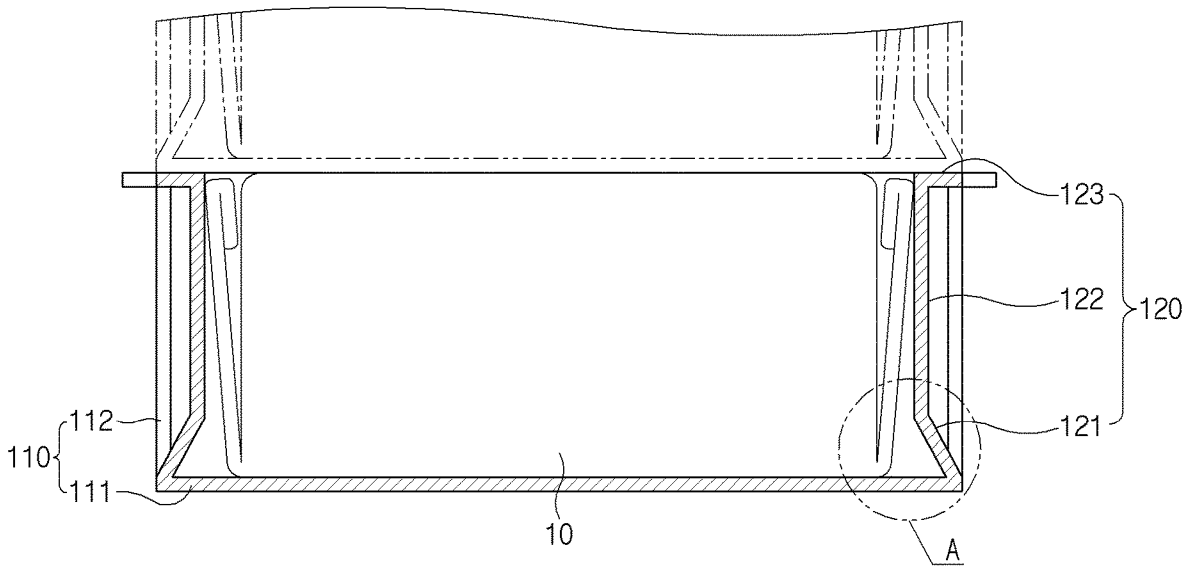
FIG. 6 is a cross-sectional view illustrating a state of use of the tray for the secondary battery according to the first embodiment of the present invention.
Figure 7:
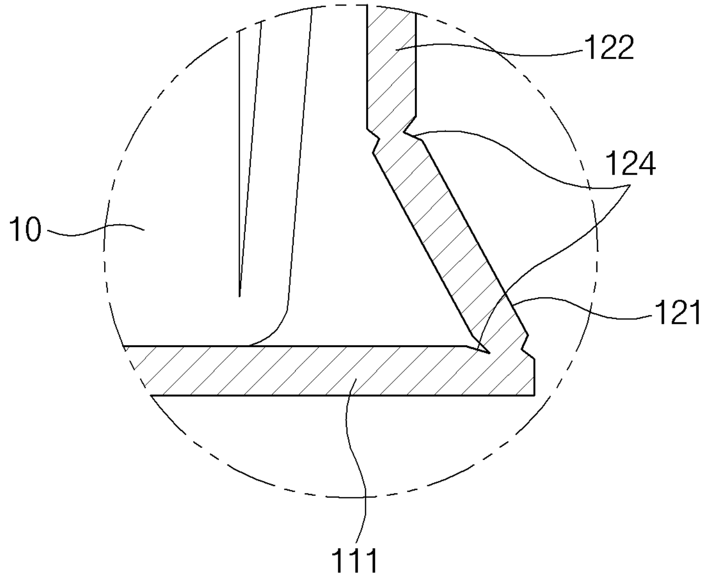
FIG. 7 is an enlarged view of a portion 'A' illustrated in FIG. 6.

A length of the pressing surface 122 protruding from the accommodation part 110 is equal to or less than a height of the foldable surface 121 (a vertical length of the foldable surface when viewed in FIG. 2).

The accommodation part 110 and the pressing part 120 are integrally formed, and the foldable surface 121, the pressing surface 122, and the pushing surface 123 are integrally formed. Thus, the tray may be manufactured more easily.

A folding groove 124 for inducing the folding is formed in a connection portion between the bottom surface 111 and the foldable surface 121 or a connection portion between the foldable surface 121 and the pressing surface 122. Thus, the foldable surface 121 is induced to be folded to the secondary battery 10 accommodated in the accommodation part 111 through the folding groove 124.

A cover plate 130 that is a pressing object may be disposed on the top surface of the tray 100 for the secondary battery loaded at the uppermost end among the trays 100 for the secondary battery loaded in the multiple stages, and the cover plate 130 may allow the pressing part 120 of the tray 100 for the secondary battery 100, which is loaded at the uppermost end, to descend by the pressing thereof and simultaneously to move to the secondary battery to fix the accommodated secondary battery 10.

Therefore, the tray 100 for the secondary battery according to the first embodiment of the present invention may comprise the pressing part to press and fix the secondary battery accommodated in the accommodation part, thereby preventing the secondary battery from being damaged by movement of the secondary battery or an external impact.

Hereinafter, a state of use of the tray according to the first embodiment of the present invention will be described.

First, a plurality of trays 100 for secondary batteries, in which the accommodation part 110 and the pressing part 120 are formed, are prepared, and then the secondary batteries 10 are accommodated in the plurality of trays 100, respectively. Here, each of the secondary batteries 10 is accommodated in the tray 100 in a state in which a sealing part is folded.

Then, the plurality of trays 100 are loaded in a vertical direction. Thus, the pressing part 120 of the tray 100 loaded on a lower side may be pressed by pressing of the tray 100 loaded on an upper side to press and fix the side portion of the secondary battery 10 accommodated in the tray 100.

That is, the pushing surface 123 of the pressing part 120 provided in the tray 100 loaded at the lower side may be pressed by the pressing of the tray 100 loaded at the upper side, and thus, the pressing surface 122 may descend by the pushing surface 123. Here, the foldable surface 121 may be folded to the secondary battery 10 by the pressing surface 122, and thus, the pressing surface 122 may descend and simultaneously move to the secondary battery 10. As a result, the pressing surface 122 may press the side portion of the secondary battery 10 accommodated in the accommodation part 110 to fix the secondary battery 10.

Thereafter, when the trays 100 loaded in the vertical direction are individually separated from each other, the pressing part 120 of the tray 100 may return to its original position while the pressing of the tray 100 is removed, and as a result, the secondary battery 10 may be easily unloaded while removing the pressing force for the secondary battery 10 accommodated in the accommodation part 110.

Hereinafter, in descriptions of another embodiment of the present invention, constituents having the same function as the above-mentioned embodiment have been given the same reference numeral in the drawings, and thus duplicated description will be omitted.

Tray Assembly According to Second Embodiment of the Present Invention

Figure 8:
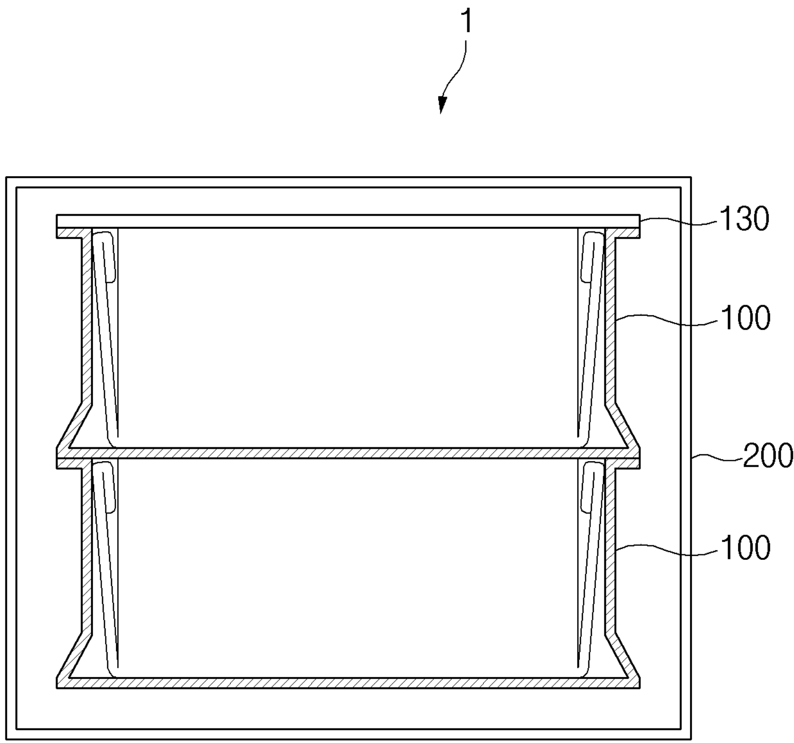
FIG. 8 is a side view of a tray assembly according to a second embodiment of the present invention.

As illustrated in FIG. 8, a tray assembly 1 according to a second embodiment of the present invention comprises a tray 100 for a secondary battery, which accommodates a secondary battery 10, and an accommodation box 200 accommodating the tray 100 for the secondary battery.

The tray 100 for the secondary battery comprises an accommodation part 110 accommodating the secondary battery 10 and a pressing part 120 pressing and fixing the secondary battery 10 accommodated in the accommodation part 110.

The tray 100 for the secondary battery has the same configuration and function as the tray for the secondary battery according to the foregoing first embodiment, and thus, duplicated descriptions thereof will be omitted.

The accommodation box 200 has an accommodation space for accommodating the vertically loaded trays 100 for the secondary batteries.

Therefore, the tray assembly 1 according to the second embodiment of the present invention may stably accommodate the plurality of trays, and in particular, may improve fixing force for the secondary batteries accommodated in the plurality of trays to prevent the secondary batteries from being damaged due to movement or an external impact.

Figure 9:
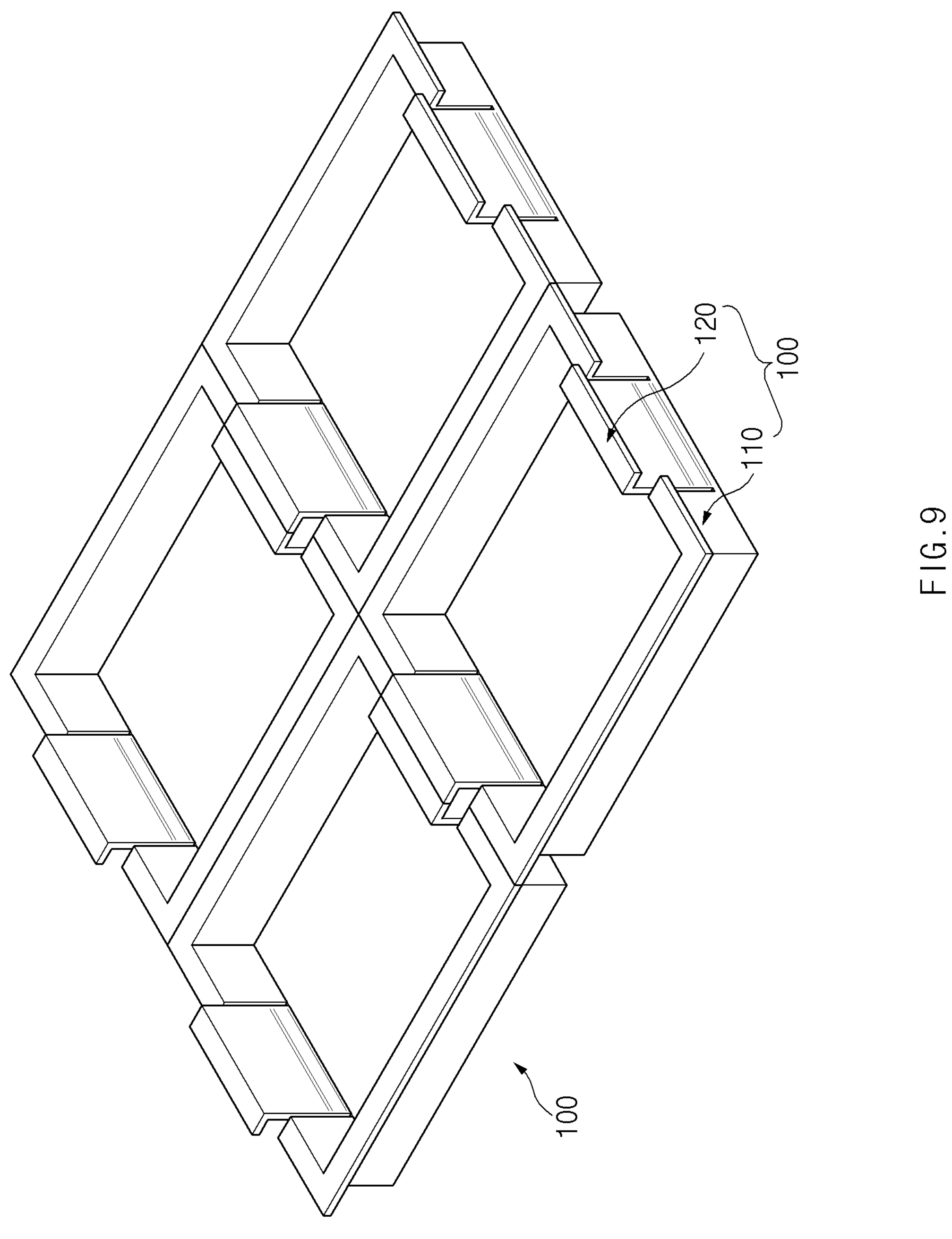
FIG. 9 is a perspective view of a tray for a secondary battery according to a third embodiment of the present invention.

Tray for Secondary Battery According to Third Embodiment of the Present Invention As illustrated in FIG. 9, trays 100 for secondary batteries according to a third embodiment of the present invention are coupled to be connected to each other in horizontal and vertical directions to improve convenience and efficiency of use.

That is, the trays 100 for the secondary batteries according to the third embodiment of the present invention may be coupled to be connected to each other in 田 (field) shape.

The trays corresponding to each other may be coupled to each other through grooves and protrusions or an adhesive layer (i.e., adhesive or adhesive tape).

Figure 10:
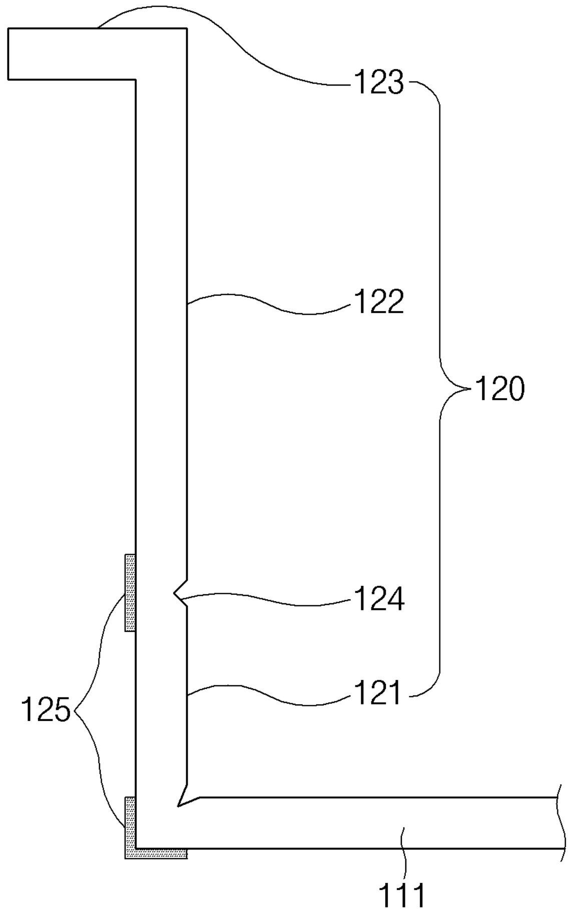
FIG. 10 is a cross-sectional view illustrating a tray for a secondary battery according to a fourth embodiment of the present invention.
Figure 11:
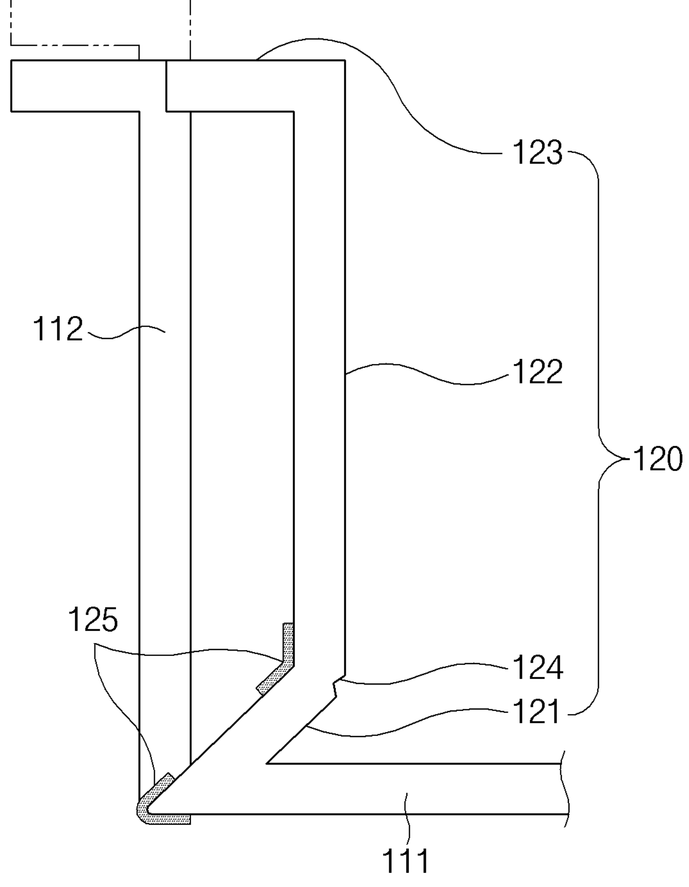
FIG. 11 is a cross-sectional view illustrating a state of use of the tray for the secondary battery according to the fourth embodiment of the present invention.

Tray for Secondary Battery According to Fourth Embodiment of the Present Invention As illustrated in FIGS. 10 and 11, a tray 100 for a secondary battery according to a fourth embodiment of the present invention comprises an accommodation part 110 and a pressing part 120. Here, the accommodation part 110 comprises a bottom surface 111 and a side surface 112, and the pressing part 120 comprises a foldable surface 121 and a pressing surface 122.

Here, an elastic part 125 having elastic restoring force may be provided at a connection portion between the bottom surface 111 and the foldable surface 121 or a connection portion between the foldable surface 121 and the pressing surface 122. Thus, the elastic part may allow each of the foldable surface 121 and the pressing surface 122 to quickly return to its original position when the tray 100 for the secondary battery, which is loaded on an upper end, is removed.

Therefore, the tray 100 for the secondary battery according to the fourth embodiment of the present invention may comprise the elastic part 125 to quickly release pressing force of the tray 100.

Figure 12:
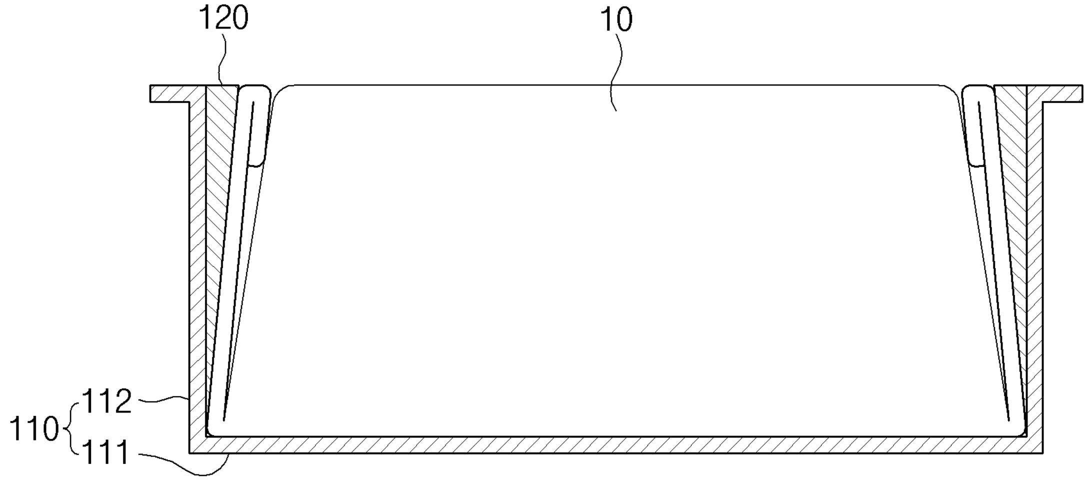
FIG. 12 is a cross-sectional view of a tray for a secondary battery according to a fifth embodiment of the present invention.

Tray for Secondary Battery According to Fifth Embodiment of the Present Invention As illustrated in FIG. 12, a tray 100 for a secondary battery according to a fifth embodiment of the present invention comprises an accommodation part 110 accommodating a secondary battery 10 and a pressing part 120 pressing and fixing the secondary battery 10 accommodated in the accommodation part 110.

The accommodation part 110 comprises a bottom surface 111, on which the secondary battery 10 is disposed, and a side surface 112 provided along an edge of the bottom surface 111 to accommodate the secondary battery 10.

The pressing part 120 is provided in an opening groove of the side surface 112 and has a structure that protrudes to the secondary battery 10 accommodated in the accommodation part 110 to press a side surface of the secondary battery 10 accommodated in the accommodation part 110, thereby fix the secondary battery 10.

Here, the pressing part 120 and the side surface 112 are integrally formed.

Therefore, in the tray 100 according to the fifth embodiment of the present invention, the secondary battery 10 may be stably fixed by pressing the secondary battery 10 accommodated in the accommodation part 110 through the pressing part 120, and thus, the secondary battery 10 may be prevented from being damaged.

In the tray 100 according to the fifth embodiment of the present invention, the pressing part 120 has an inverted triangular cross-sectional shape in which a thickness of the pressing part 120 gradually increases in a direction of the secondary battery from a lower end to an upper end of the side surface 112, to which the bottom surface 111 is connected. That is, the secondary battery 10 accommodated in the tray 100 may be prevented from being pulled out through the pressing part 120 having the inverted triangular cross-section, and simultaneously, the side portion of the secondary battery 10 may be pressed to fix the secondary battery 10.

Figure 13:
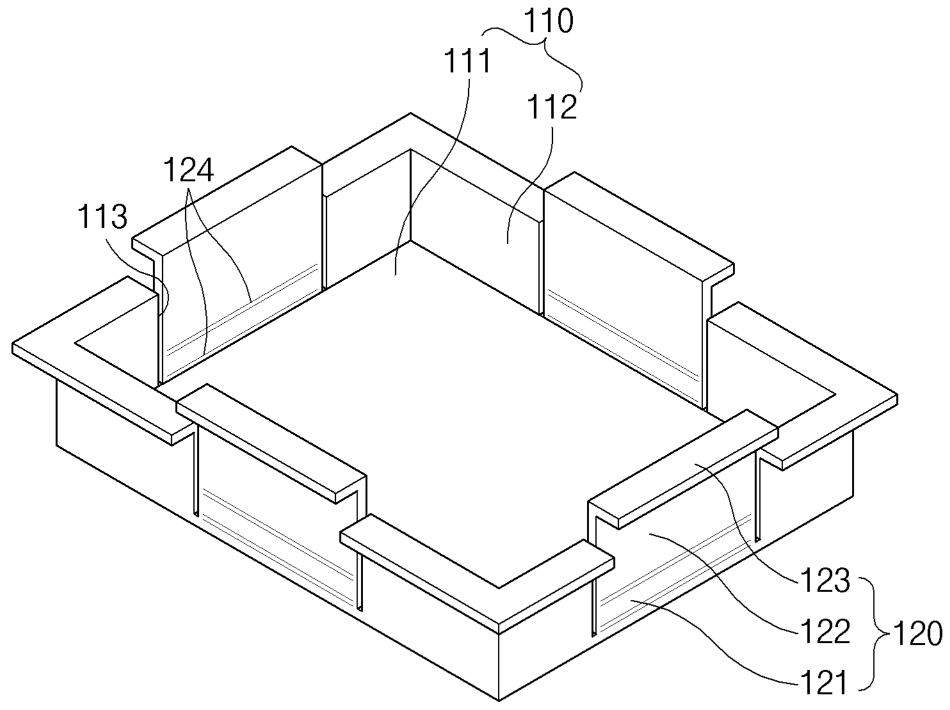
FIG. 13 is a perspective view illustrating a tray for a secondary battery according to a sixth embodiment of the present invention.

Tray for Secondary Battery According to Sixth Embodiment of the Present Invention As illustrated in FIG. 13, a tray 100 for a secondary battery according to a sixth embodiment of the present invention may comprise a pressing part 120 on an entire side surface 112 of an accommodation part 110.

That is, four side surfaces of the accommodation part 110 are connected to accommodate the secondary battery, and the pressing part 120 is provided on the four side surfaces 112, respectively, to press the entire side surface of the secondary battery 10. Thus, the entire side surface of the secondary battery 10 accommodated in the accommodation part 110 may be pressed, and as a result, the secondary battery 10 may be more firmly fixed.

In the tray according to the present invention, a full-width length of the accommodation part and a full-width length of the pressing part may be differently applied according to specifications of the secondary battery. Thus, it is possible to sufficiently secure a free space between the secondary battery accommodated in the tray and the pressing part, that is, it is possible to secure a sufficient area for operations of hands, tools, and machines, so that the secondary battery is easily accommodated into or separated from the tray.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

1: Tray assembly
100: Tray
110: Accommodation part
111: Bottom surface
112: Side surface
113: Opening groove
120: Pressing part
121: Foldable surface
122: Pressing surface
123: Pushing surface
124: Folding groove
125: Elastic part
130: Cover plate
200: Accommodation box

The invention claimed is:

1. A tray for a secondary battery, which is loaded in multiple stages, the tray comprising:

an accommodation part having a bottom surface, on which the secondary battery is configured to be disposed, and a side surface provided along an edge of the bottom surface to accommodate the secondary battery; and a pressing part configured to press a side portion of the secondary battery while descending toward the bottom surface and moving to the secondary battery due to a load applied to an upper end of the pressing part to fix the secondary battery, wherein the accommodation part is provided with an opening groove in the side surface, and the opening groove is formed to be opened from a boundary line between the bottom surface and the side surface to an upper end of the side surface, and the pressing part is provided in the opening groove and has a lower end connected to the boundary line between the bottom surface and the side surface and the upper end of the pressing part protrudes above an upper end of the side surface.

2. The tray of claim 1, wherein the pressing part comprises:

a foldable surface connected to be foldable in a direction of the secondary battery at the boundary line between the bottom surface and the side surface; and a pressing surface having a lower end connected to an upper end of the foldable surface and an upper end protruding above the upper end of the side surface to descend toward the bottom surface by pressing another tray loaded on the upper end of the pressing surface to engage the secondary battery by folding of the foldable surface.

3. The tray of claim 2, wherein the pressing part further comprises a pushing surface provided on the upper end of the pressing surface and having an area greater than that of the pressing surface to support the another tray loaded on the upper end.

4. The tray of claim 3, wherein the foldable surface, the pressing surface, and the pushing surface are integrally formed.

5. The tray of claim 1, wherein the accommodation part and the pressing part are integrally formed.

6. The tray of claim 2, wherein a folding groove for inducing the folding is formed in a connection portion between the bottom surface and the foldable surface or a connection portion between the foldable surface and the pressing surface.

7. The tray of claim 2, wherein an elastic part having an elastic restoring force is further provided at a connection portion between the bottom surface and the foldable surface or a connection portion between the foldable surface and the pressing surface, and the elastic part allows each of the foldable surface and the pressing surface to return to its original position when the another tray loaded on the upper end is removed.

8. A tray assembly for a secondary battery, comprising:

the tray for the secondary battery of claim 1; and an accommodation box configured to accommodate the tray for the secondary battery.

* * * * *